United States Patent [19]

Seneker et al.

[11] Patent Number: 5,648,447

[45] Date of Patent: Jul. 15, 1997

[54] ELASTOMERIC POLYURETHANES WITH IMPROVED PROPERTIES BASED ON CRYSTALLIZABLE POLYOLS IN COMBINATION WITH LOW MONOL POLYOXPROPYLENE POLYOLS

[75] Inventors: Stephen D. Seneker, Sissonville; Nigel Barksby, Dunbar; Bruce D. Lawrey, Charleston, all of W. Va.

[73] Assignee: ARCO Chemical Technology, L.P., Greenville, Del.

[21] Appl. No.: 577,959

[22] Filed: Dec. 22, 1995

[51] Int. Cl.⁶ .................................................. C08G 18/10
[52] U.S. Cl. ........................ 528/63; 528/64; 528/65; 528/66; 528/76; 252/182.2; 252/182.22; 521/159; 521/174; 521/163
[58] Field of Search .................. 528/63, 64, 65, 528/66, 76; 252/182.2, 182.22; 521/174, 159

[56] References Cited

U.S. PATENT DOCUMENTS

| 3,980,606 | 9/1976 | Werner ........................ 528/64 |
| 5,026,815 | 6/1991 | Völker et al. .................. 528/64 |
| 5,185,420 | 2/1993 | Smith et al. .................... 528/61 |
| 5,470,813 | 11/1995 | Le Khac ........................ 502/175 |

*Primary Examiner*—Rachel Gorr
*Attorney, Agent, or Firm*—Jonathan L. Schuchardt

[57] ABSTRACT

Polyurethane elastomers of improved elongation, tensile strength and other physical properties are prepared from a polyol component containing a crystallizable polyol and from 5 to 35 equivalent percent of a low monol polyoxypropylene polyol by one-shot, quasiprepolymer, and preferably, by prepolymer techniques involving chain extension with an aliphatic diol or aromatic amine.

43 Claims, No Drawings

ELASTOMERIC POLYURETHANES WITH IMPROVED PROPERTIES BASED ON CRYSTALLIZABLE POLYOLS IN COMBINATION WITH LOW MONOL POLYOXPROPYLENE POLYOLS

TECHNICAL FIELD

The present invention pertains to polyurethane elastomers. More particularly, the present invention pertains to polyurethane elastomers having improved physical properties. Preferably, these elastomers are prepared by chain extending isocyanate-terminated prepolymers prepared from mixtures of crystallizable polyols and low monol polyoxypropylene polyols.

BACKGROUND ART

Polyurethane elastomers are widely used in such diverse applications as gasketing and sealing materials, medical devices, ski boots, jounce bumpers, and conveyor rollers, to name but a few. Due to their strength, hardness, and other properties, elastomers prepared from isocyanate-terminated prepolymers incorporating polytetramethylene ether glycol (PTMEG) and polyester polyols are dominant in demanding applications. The PTMEG and polyester polyol components are termed "crystallizable" polyols, due to their stress-induced molecular alignment into configurations which resemble crystalline structures. Polyoxyethylene glycols are further examples of crystallizable polyols. The "crystalline" alignment, together with the intermolecular forces such as polar attractions and van der Waals attractions which such alignments induce, are believed responsible for the desirable physical properties demonstrated by such elastomers. See, e.g., "Comparison of the Dynamic Properties of Polyurethane Elastomers Based on Low Unsaturation Polyoxypropylene Glycols and Poly(tetramethylene oxide) Glycols," A. T. Chen et al., Polyurethane World Congress 1993, pp. 388–399.

PTMEG, polyester polyols and "crystallizable" polyols other than polyoxyethylene glycols tend to be high cost starting materials, however. As a result, polyurethane elastomers prepared from these components also are higher priced products. Moreover, the elongations of elastomers prepared from crystallizable polyols are generally limited to the range of 400 to 600 percent. Elongations can be increased by adding materials such as plasticizers or monofunctional reactive species to serve as chain terminators. However, any increase in elongation is obtained only at the expense of marked reduction in tensile strength, usually accompanied also by a decrease in hardness. It would be desirable to increase both elongation and tensile strength in elastomers prepared from crystallizable polyols.

Polyoxypropylene diols having low unsaturation have been suggested to wholly replace PTMEG in elastomer prepolymer formulations, however, the properties of the resulting elastomers are little improved, exhibiting somewhat improved tear strength but similar tensile strengths and elongations. See, A. T. Chen, op.cit. However, in many applicaitons, it would be desirable to retain the known benefits of crystallizable polyol-based elastomers while being able to improve properties such as tensile strength and elongation.

SUMMARY OF THE INVENTION

It has now been surprisingly discovered that polyurethane elastomers having improved tensile strength, elongation, or improvements in both these properties, may be prepared using a polyol component containing a crystallizable polyol together with from about 5 to about 35 equivalent percent of a low monol polyoxypropylene polyol. The elastomers are most preferably synthesized by the chain extension of isocyanate-terminated prepolymers prepared by reacting a stoichiometric excess of lone or more di- or polyisocyanates with the aforementioned polyol component. The isocyanate-terminated prepolymers may be used to prepare diol and aromatic amine extended polyurethane elastomers suitable for applications where conventional elastomers lack the requisite elongation and/or tensile strength. In addition, tear strength is improved significantly as well. Quasiprepolymer and one-shot techniques of elastomer formation utilizing the subject polyol components are also useful.

DESCRIPTION OF THE PREFERRED EMBODIMENTS

The polyurethane elastomers of the subject invention are preferably prepared by the chain extension of an isocyanate-terminated prepolymer with a conventional diol chain extender, or mixture thereof. The isocyanate-terminated prepolymer is prepared by reacting one or more di- or polyisocyanates with a polyol component containing a crystallizable polyol and from about 5 equivalent percent to about 35 equivalent percent of a low monol-content polyoxypropylene polyol. Quasiprepolymer techniques, where the isocyanate is reacted with only a minor amount of the total polyol component, i.e. 10 equivalent percent, are also useful, the remainder of the subject polyol component being present in the elastomer formulation resin side (B-side). One-shot elastomers where the total subject polyol component is present in the B-side are useful as well.

The isocyanates useful in preparing the isocyanate-terminated prepolymers of the subject invention are aromatic, aliphatic, or cycloaliphatic di- or polyisocyanates. Suitable examples include 2,4- and 2,6-toluene diisocyanates and their mixtures, particularly an approximately 80:20 mixture of the 2,4- and 2,6-isomers; 2,2'-, 2,4'- and particularly 4,4'-methylenediphenylene diisocyanate and their mixtures; polyphenylene polymethylene polyisocyanates (poly-MDI, PMDI); their saturated, cycloaliphatic analogues, for example 2,4-, and 2,6-methylcyclohexane diisocyanate and 2,2'-, 2,4'-, and 4,4'-methylene dicyclohexylene diisocyanate and other isomers thereof; isophorone diisocyanate, 1,4-diisocyanatobutane, 1,5-diisocyanatopentane, 1,6-diisocyanatohexane, 1,4-cyclohexane diisocyanate, and the like.

Modified di- and polyisocyanates are also useful. Such modified isocyanates include urea modified isocyanates, biuret modified isocyanates, urethane modified isocyanates, isocyanurate modified isocyanates, allophanate modified isocyanates, carbodiimide modified isocyanates, uretdione modified isocyanates, uretonimine modified isocyanates, and the like. Such modified isocyanates are commercially available, and are prepared by reacting an isocyanate with a less than stoichiometric amount of an isocyanate-reactive compound, or with itself. For example, urea-modified isocyanates and urethane modified isocyanates may be prepared by reacting a di- or polyisocyanate with minor quantities of water or a diamine, or with a glycol, respectively, while carbodiimide-, uretonimine-, and isocyanurate-modified isocyanates are prepared by inter-reaction of isocyanates with themselves in the presence of a suitable catalyst.

Among the isocyanates listed above, preference is given to toluene diisocyanates (TDI), methylene diphenylene diisocyanates, preferably "pure" 4,4'-MDI, carbodiimide modified MDI, and aliphatic and cycloaliphatic isocyanates, particularly 1,6-diisocyanatohexane, isophorone diisocyanate, the various methylcyclohexylene diisocyanates, and the various methylene dicyclohexylene diisocyanates. Mixtures of isocyanates are also suitable, in particular mixtures of TDI and MDI, and mixtures of MDI and carbodiimide-modified MDI.

The crystallizable polyols useful in the subject invention include any polyol with suitable molecular weight which exhibits stress-induced crystallization in elastomers. The crystallizable polyols are preferably difunctional, however minor amounts of tri- or higher functionality crystallizable polyols may be used as well, for example less than about 20 percent by weight, preferably less than 10 percent by weight, and most preferably less than 5 percent by weight relative to total crystallizable polyol. As used herein, the term "crystallizable polyol" includes difunctional crystallizable polyols with at most about 20 weight percent of higher functionality species. The equivalent weight of the crystallizable polyol component may be from 500 Da to 6000 Da, preferably from 800 Da to 5000 Da, and in particular from 1000 Da to 4000 Da. Molecular weights and equivalent weights herein in Da (Daltons) refer to number average equivalent weights unless otherwise specified.

Examples of crystallizable polyols suitable for the practice of the present invention include preferably polyoxyethylene glycols, polytetramethylene ether glycols, and polyester polyols. Polytetramethylene ether glycols having equivalent weights of from 500 Da to 4000 Da are preferred.

Polyoxyethylene glycols are well known, and are generally prepared by the base-catalyzed oxyethylation of a dihydric initiator molecule with ethylene oxide. Any suitable dihydric initiator may be used, non-limiting examples being water, ethylene glycol, propylene glycol, diethylene glycol, neopentyl glycol, and the like. However, the most stereoregular polyoxyethylene glycols are prepared from ethylene glycol or a low molecular weight oxyethylated oligomer such as diethylene glycol, triethylene glycol, and the like. Polyoxyethylene glycols having equivalent weights of from about 800 Da to 4000 Da are preferred, with equivalent weights in the range of 1000 Da to 3000 Da being more preferred.

Polytetramethylene ether glycols (PTMEG) are commercial items and readily available. PTMEGs are prepared by the ring-opening polymerization of tetrahydrofuran, generally in the presence of Lewis acid catalysts. PTMEG polyols have a relatively high methylene to oxygen ratio, are essentially linear, and offer low water absorption, high hydrolytic stability, and good stress-induced crystallinity due to their regular and sterically unhindered structure. PTMEGs having equivalent weights of about 800 Da to 1500 Da are particularly useful.

Polyester polyols are also commercially available. Such polyester polyols may be broadly classified as homopolymeric and co- and terpolymeric, although some of these terms are used interchangeably. Homopolymeric polyesters are prepared by polymerizing a monomer containing both hydroxyl and carboxylic acid functionalities or their chemical equivalents. The most common homopolymeric polyester is polycaprolactone, prepared by the inter-transesterification ring opening polymerization of ε-caprolactone. Polycaprolactone polyesters have a uniform head/tail structure which encourages crystallinity. Other lactones and molecules having both hydroxyl and carboxylic functionality are suitable for preparing polycaprolactone polyols. Addition of other di- or higher functionality hydroxyl-functional or carboxylic acid-functional molecules can be used to modify the functionality or structure of the polycaprolactone polyols.

Co- and terpolyester polyols are also commercially available, and are the reaction product of a stoichiometric excess of a diol and a dicarboxylic acid or esterifyable derivative thereof. When a single diol and single dicarboxylic acid is utilized, the resultant product is a copolyester, often termed simply a "polyester." Examples are polyethyleneadipate, a polyester formed from ethylene glycol and adipic acid; polybutyleneadipate, a polyester formed from 1,4-butanediol and adipic acid; polyethyleneterephthalate, a polyester formed from ethylene glycol and terephthalic acid or an esterifyable or transesterifyable derivative such as dimethylterephthalate; and the like. When two or more glycols and/or two or more dicarboxylic acids are used in the polyesterification reaction, terpolyesters are produced. An example is polyethylenebutyleneadipate, prepared from a mixture of ethylene glycol, 1,4-butanediol, and adipic acid. Tri- or higher-functional polyols and tri- or higher functional carboxylic acids may be added, generally in minor quantities, to prepare polyester polyols with average functionalities greater than two.

Homopolymeric polyester polyols such as polycaprolactone, and copolyester polyols formed from but one diol and one dicarboxylic acid are preferred due to their ease of stress-induced crystallizability, the latter due to their linear and regular repeating structure. Particularly preferred are polycaprolactone diols and polybutyleneadipate diols having equivalent weights in the range of 500 Da to 4000 Da, preferably 800 Da to 2000 Da, and most preferably about 1000 Da.

The low monol polyoxypropylene polyol used in admixture with the crystallizable polyol is a critical element of the subject polyol component compositions. Traditionally, polyoxypropylene polyols have been prepared by the base catalyzed oxypropylation of a suitably hydric, oxyalkylatable initiator molecule in the presence of a basic oxypropylation catalyst such as sodium or potassium hydroxide or the corresponding alkoxides. Under basic oxyalkylation conditions, as discussed by Ceresa, Ed., in Block and Graft Polymerization, Vol.2, John Wiley & Sons, pp. 17–21, some of the propylene oxide introduced rearranges to form allyl alcohol, an unsaturated monohydroxyl-functional compound which itself then serves as an additional oxyalkylatable initiator molecule. As this rearrangement continues during the course of the oxyalkylation, both the measured functionality and molecular weight distribution of the product change during oxypropylation.

The continued introduction of monofunctional species lowers the overall functionality, and thus a 2000 Da equivalent weight, diol-initiated polyol may contain 40 to 50 mol percent or more of monofunctional species. As a result, the "nominal" or "theoretical" functionality of two due to the difunctionality of the diol initiator, may be lowered to c.a. 1.6 to 1.7 or less. At the same time, the continued introduction of low molecular weight monol and oxyalkylation of this monofunctional species creates a broad molecular weight distribution, or high polydispersity, in the polyol product. The relative amount of monol present is generally determined by measuring the unsaturation of the polyol, expressed as meq unsaturation per gram of polyol, hereinafter, "meq/g". Unsaturation is measured in accordance with ASTMD-2849-69 "Testing Urethane Foam Polyol Raw Materials." Conventional, base-catalyzed polyoxypropylene diols in the 2000 Da equivalent weight range generally have measured unsaturations in the range of 0.07 to 0.12 meq/g.

Due to the high level of unsaturation and the high level of monofunctional species which the unsaturation reflects, the practical equivalent weight of polyoxypropylene diols is limited to about 2000 Da. As a result, numerous methods have been introduced to lower unsaturation and attendant monofunctional species. Use of cesium and rubidium hydroxides instead of the far less expensive sodium and potassium hydroxides has lowered unsaturation somewhat, as illustrated by U.S. Pat. No. 3,393,243, as has use of barium or strontium hydroxides, as illustrated by U.S. Pat. Nos. 5,010,187 and 5,114,619. Use of metal carboxylate catalysts such as calcium naphthenate such as is disclosed in U.S. Pat. No. 4,282,387, with or without tertiary amines as co-catalysts have lowered unsaturation to the range of 0.04 meq/g. However, due to the cost of such catalysts and the limited improvement in unsaturation level, little if any commercialization of polyols prepared from such catalysts has occurred.

Double metal cyanide complex catalysts, originally introduced in the decade of the 60's, and improved upon since, as illustrated by the present assignee's U.S. Pat. No. 5,158,922, has enabled polyether polyol production with unsaturations in the range of 0.015 to 0.018 meq/g, a considerable improvement. However, the expense of such catalysts coupled with the increased processing time and expense associated with catalyst removal from the polyol product has, until recently, prevented commercialization of low unsaturation, double metal cyanide complex-catalyzed polyols.

Most recently, however, the present assignee has developed new double metal cyanide catalysts which exhibit exceptionally high catalytic activity; which produce polyol products with exceptionally low levels of unsaturation, for example in the range of 0.002 to 0.007 meq/g; and which can be readily removed from the polyol product by simple filtration. While the measurable unsaturation implies at least some monol content, low molecular weight species which would be expected to occur are difficult to detect with conventional gel permeation chromotography. Moreover, the polydispersities of the products is exceptionally low, the polyols being virtually monodisperse.

The polyoxypropylene polyols useful in the subject invention are limited to those having low monol content, the monol content, specified in terms of polyol unsaturation, being lower than about 0.02 meq/g, preferably lower than 0.010 meq/g, and most preferably about 0.007 meq/g or lower. The polyoxyalkylene polyols are preferably difunctional, although minor amounts of higher functionality polyols may be used as well. The term "polyoxypropylene polyol" as used herein includes polyoxypropylene diols containing up to about 20 weight percent of tri- or higher-functionality polyoxypropylene species. The polyoxypropylene diols are preferably homopolyoxypropylene diols. However, random, block, or block/random copolymer diols containing up to 30 weight percent oxyethylene moieties, preferably not more than 20 weight percent oxyethylene moieties, may be used as well, as may also polyoxypropylene polyols containing minor amounts of higher alkylene oxide-derived moieties, particularly those derived from 1,2- and 2,3-butylene oxide. The term "polyoxypropylene polyol" includes such predominantly propylene oxide-derived polyoxyalkylene copolymers as well. Preferably, the polyoxypropylene polyols are substantially all propylene oxide-derived, and most preferably substantially difunctional. The equivalent weights of the low monol polyoxypropylene polyols may range from about 1000 Da to about 6000 Da, preferably 1250 Da to 4000 Da, and most preferably 1500 Da to 3000 Da. Equivalent weights of about 2000 Da have been found particularly well suited in the practice of the subject invention.

When such low monol polyoxypropylene polyols are used in conjunction with a crystalline polyol to prepare polyurethane elastomers, preferably through use of isocyanate-terminated prepolymers which are subsequently chain-extended, it has been surprisingly discovered that as little as about 5 equivalent percent of the polyoxypropylene polyol is effective to significantly increase elongation while maintaining or increasing tensile strength in the resulting elastomers, as compared to otherwise similar elastomers containing only crystallizable polyol. With PTMEG polyols, for example, 5 equivalent weight percent of a 2000 Da equivalent weight polyoxypropylene diol when used in conjunction with the crystallizable 1000 Da equivalent weight PTMEG diol shows an increase in elongation of 103% over an all-PTMEG-derived elastomer while exhibiting a slight but significant increase in tensile strength. Tear strength is significantly improved also. At 20 mol percent polyoxypropylene diol, the results are even more surprising, elongation increasing by 149%, while tensile strength is increased by 13%. Tear strength remains higher as well. These physical properties remain elevated until the amount of low monol polyoxypropylene diol reaches about 35 equivalent percent of the total polyol, following which tensile strength and elongation markedly decrease to levels approaching or even lower than those for all-polyoxypropylene diol-derived elastomers. These effects are particularly surprising in view of the fact that conventional, base-catalyzed polyoxypropylene diols within the normal range of unsaturation show little increase in either elongation or tensile strength until a concentration of 25 equivalent weight percent is reached, at which point elongation increases by 47% at the expense of a 34% decrease in tensile strength. Elongations of about 800% or more cannot be achieved at all while maintaining suitable tensile strength when conventional, high unsaturation, polyoxypropylene diols are used.

The isocyanate-terminated prepolymers of the subject invention have isocyanate group contents expressed in weight percent (% NCO) of 3% NCO to 14% NCO, preferably 4% NCO to 10% NCO, and particularly 4% NCO to 8% NCO. The prepolymers are prepared by conventional techniques, by reacting a mixture of crystallizable polyol and low monol polyoxypropylene polyol with a sufficient stoichiometric excess of isocyanate to provide the desired isocyanate group content. The prepolymer reactive components are preferably reacted neat under a nitrogen blanket at temperatures ranging from room temperature to about 100° C., preferably in the range of 40°–70° C. Urethane group-promoting catalysts such as tin catalysts may be added if desired, but are not ordinarily necessary. Prepolymer preparation methods are well known, and may be found, for example in the Polyurethane Handbook, G. Oertel, Ed., Hanser Publications, Munich, 1985, or the treatise by J. H. Saunders and K. C. Frisch, Polyurethanes: Chemistry and Technology, Interscience Publishers, New York, 1963.

Chain extenders useful in preparing elastomers of the subject invention include in particular, the common diol chain extenders, non-limiting examples of which include ethylene glycol, diethylene glycol, triethylene glycol, propylene glycol, dipropylene glycol, tripropylene glycol, 1,4-butanediol, 1,6-hexanediol, neopentyl glycol, 0,0'-bis(2- hydroxyethyl)-hydroquinone, 1,4-cyclohexanedimethanol, 1,4-dihydroxycyclohexane, and the like. Ethylene glycol, propylene glycol, 1,4-butanediol and 1,6-hexanediol are preferred, 1,4-butanediol being particularly preferred. Minor amounts of cross-linkers such as glycerine, diethanolamine, and triethanolamine may be used in conjunction with the diol chain extenders, but are not preferred.

Aromatic amine chain extenders are also useful. Particularly preferred amine chain extenders are aromatic amines such as the various toluene diamines and methylenedianilines, and particularly substituted aromatic amines which provide slower reaction by electronic or steric effects, such as MOCA (4,4'-methylene-bis-o-chloroaniline), M-CDEA (4,4'-methylenebis(3-chloro-2,6-diethylaniline) and the various ar-alkylated toluenediamines and methylenedianilines. Other chain extenders are useful, as well as mixtures of various types of chain extenders.

The isocyanate-terminated prepolymers are reacted with chain extenders and optional cross-linking agents at isocyanate indexes of from 70 to 130, preferably 90 to 110, and most preferably 95 to 105. The elastomers preferably have hardnesses in the range of Shore A 30 to Shore A 95, preferably from Shore A 70 too Shore A 90. Both harder and softer elastomers may be prepared as well. The curing of the prepolymer may be effected with heat, with the aid of catalysts such as dibutyltin diacetate, stannous octoate, or dibutyltin dilaurate, amine catalysts, or combinations thereof. If microcellular elastomers are desired, a small quantity of physical or chemical blowing agent, particularly water, may be added, or the curing elastomer may be frothed by intensive mixing with air, nitrogen, or $CO_2$, or liquid $CO_2$ may be incorporated in the curable elastomer reactive mixture. Water is a preferred blowing agent, in amounts effective to provide microcellular elastomer densities in the range of 0.15 g/cm$^3$ to 0.8 g/cm$^3$, preferably 0.2 g/cm$^3$ to 0.5 g/cm$^3$.

The reactive mixture of isocyanate-terminated prepolymer, chain extender(s), optional blowing agents, pigments, thermal and UV stabilizers, fillers, reinforcing agents, cross-linkers, and other additives and auxiliaries may be intensively mixed, injected into a suitable mold, extruded, or deposited on a moving belt. In the case where substantially all reactive components are difunctional, an extruded or belt-deposited elastomer may subsequently be granulated and remelted, in other words, is a thermoplastic polyurethane (TPU). The TPU may be introduced into an extruder or other device, REMELTED, and injection molded, blow molded, etc., to form a wide variety of products.

In the quasiprepolymer technique, a quasiprepolymer is prepared from excess isocyanate and only a minor portion of the polyol component in the same manner as the isocyanate-terminated prepolymers heretofore described. Due to the lesser amount of polyol component to isocyanate, however, the % NCO contents of quasiprepolymers are higher than the % NCO of prepolymers. Isocyanate group contents of from 14 weight percent NCO to 20 weight percent NCO are suitable, for example. When using quasiprepolymers, the remainder of the polyol component will be introduced together with the diol chain extender, either as a blend, or as separate streams to a mixhead.

A particularly useful quasiprepolymer technique utilizes all or virtually all of the low monol polyoxyalkylene diol and none or virtually none of the crystallizable polyol during preparation of the quasiprepolymer. The quasiprepolymer thus prepared is then chain extended with the crystallizable polyol component and chain extender by supplying both these components in the B-side of the formulation. The relative amounts of crystallizable polyol and low monol polyoxyalkylene diol are adjusted between the amounts contained in the quasiprepolymer and B-side such that the elastomer product contains from 5 to 35 equivalent percent of the low monol polyoxyalkylene polyol relative to 65 to about 95 equivalent percent crystallizable polyol.

One-shot techniques are also useful. In the "one-shot" technique, the isocyanate component is not prereacted with any substantial portion of the polyol component, the entire or virtually entire polyol component and chain extender supplied to the mixhead in a stream or streams separate from the isocyanate component. When the one-shot process is employed, it is desirable that a portion of the polyol component be a low monol polyoxyethylene capped polyoxypropylene diol, or that a minor proportion of high primary hydroxyl conventional polyoxypropylene diol be included in the formulation unless long demold and cure times can be tolerated.

When low monol polyoxyethylene capped polyoxypropylene diols are prepared by double metal cyanide complex catalysis, the final oxyalkylation may be conducted with mixtures of propylene oxide and ethylene oxide containing from 70 to approaching 90 weight percent ethylene oxide or thereabouts to prepare polyols having a cap containing predominately oxyethylene moieties. By this technique, primary hydroxyl contents of from 35 mol percent to about 50 mol percent may be prepared. If higher primary hydroxyl content, i.e. from 70 mol percent to 90 mol percent are desired, the double metal cyanide complex-catalyzed oxyalkylation may be terminated by addition of strong base, for example sodium or potassium hydroxide, which then serves as a polyoxethylation catalyst. In this manner, final oxyalkylation may be conducted with all ethylene oxide, resulting in higher primary hydroxyl content. However, low monol content is retained, as base-catalyzed oxyethylation does not introduce any substantial amount of unsaturated species as does base catalyzed oxypropylation. Most preferably, any high primary hydroxyl polyoxypropylene polyol contained in the B-side is of low monol (<0.02 meq/g) content.

Having generally described this invention, a further understanding can be obtained by reference to certain specific examples which are provided herein for purposes of illustration only and are not intended to be limiting unless otherwise specified.

EXAMPLES 1–4 AND COMPARATIVE EXAMPLES C1–C7

A series of polyurethane elastomers were prepared by chain extending 6% NCO, isocyanate-terminated prepolymers with 1,4-butanediol at an isocyanate index of 105. The isocyanate index was kept constant to facilitate comparisons between the various formulations, all the prepolymers of which were prepared by reacting a stoichiometric excess of 4,4'-MDI with a 1000 Da equivalent weight PTMEG diol containing from 0 equivalent percent to 75 equivalent percent of a 2000 Da polyoxypropylene diol having a measured unsaturation of c.a. 0.007 meq/g. A further comparative example was made employing all polyoxypropylene diol and no PTMEG. Following cure at 100° C., the elastomers were demolded and equilibrated for 2 weeks. Physical properties were then measured. The results are presented in Table 1.

TABLE 1

| Example | C1 | C2 | C3 | 1 | 2 | 3 | 4 | C4 | C5 | C6 | C7 |
|---|---|---|---|---|---|---|---|---|---|---|---|
| Equiv. % 2000 Da eq. wt. Polyoxypropylene Diol; | 0 | 1 | 2.5 | 5 | 10 | 25 | 34 | 43 | 50 | 75 | 100 |
| Wt. % 2000 Da eq. wt. Polyoxypropylene Diol | 0 | 2 | 5 | 9 | 18 | 40 | 50 | 60 | 66 | 83 | 100 |
| Hardness, Shore A | 83 | 82 | 82 | 82 | 82 | 82 | 81 | 80 | 80 | 75 | 72 |
| Resilience, % | 75 | 73 | 73 | 72 | 72 | 72 | 72 | 72 | 73 | 72 | 70 |
| Elongation, % | 510 | 580 | 570 | 1040 | 1150 | 1270 | 790 | 760 | 990 | 960 | 910 |
| Tensile Strength, psi | 4520 | 5280 | 5250 | 4790 | 4520 | 5120 | 4920 | 3450 | 3660 | 3430 | 3000 |
| 100% Modulus, psi | 770 | 730 | 730 | 720 | 670 | 650 | 640 | 610 | 580 | 510 | 500 |
| 200% Modulus, psi | 1030 | 1000 | 1010 | 970 | 900 | 900 | 890 | 860 | 830 | 740 | 710 |
| 300% Modulus, psi | 1440 | 1340 | 1340 | 1220 | 1130 | 1140 | 1150 | 1120 | 1060 | 950 | 920 |
| 400% Modulus, psi | 2130 | 1880 | 1880 | 1490 | 1390 | 1360 | 1450 | 1400 | 1300 | 1180 | 1130 |
| Die C Tear, pli | 400 | 460 | 440 | 460 | 460 | 440 | 440 | 400 | 420 | 380 | 380 |

Table 1 shows that when PTMEG prepolymers are used to prepare elastomers, addition of even low monol polyoxypropylene diols, in quantities of only 1 to 2.5 equivalent percent has no appreciable effect on elastomer physical properties, whereas addition of from 5 equivalent weight percent results in a huge increase in elongation while maintaining or increasing tensile strength. At higher levels of low monol polyoxypropylene diol content, for example in the range of 10–25 equivalent percent, elongation is further improved, as is also tensile strength. These increases in properties are maintained up to approximately 35 equivalent percent, at which concentration tensile strength remains high, elongation decreases somewhat but is still about 800%, an increase in elongation of greater than 50% as compared with the all PTMEG-prepolymer-derived elastomer. At higher levels of low monol polyoxypropylene diol, tensile strength rapidly diminishes, and the elongation is actually less than an elastomer prepared from a prepolymer derived solely from low monol polyoxypropylene diol. At 75% or more polyoxypropylene diol content, tear strength is also less than the all PTMEG-derived elastomer.

EXAMPLES 5–7 AND COMPARATIVE EXAMPLES C8 to C10

A series of elastomers derived from PTMEG-based prepolymers containing either low monol polyoxypropylene diol or PPG-4025, a conventional, base-catalyzed polyoxypropylene diol having an unsaturation of 0.070 meq/g were prepared as in Examples 1–4 and C1–C7. The physical properties of the elastomers are presented in Table 2.

TABLE 2

| Example: | C8 | 5 | C9 | 6 | C10 | 7 |
|---|---|---|---|---|---|---|
| Equiv. % PPG-4025 | 5 | — | 10 | — | 25 | — |
| Wt. % PPG-4025 | 9 | — | 18 | — | 40 | — |
| Equiv. % 2000 Da eq. wt. Polyoxypropylene Diol; | — | 5 | — | 10 | — | 25 |
| Wt. % 2000 Da eq. wt. Polyoxypropylene Diol | — | 9 | — | 18 | — | 40 |
| Hardness, Shore A | 80 | 82 | 81 | 82 | 79 | 82 |
| Resilience, % | 73 | 72 | 70 | 72 | 68 | 72 |
| Elongation, % | 630 | 1040 | 640 | 1150 | 750 | 1270 |
| Tensile Strength, psi | 4750 | 4790 | 4890 | 4520 | 2970 | 5120 |
| 100% Modulus, psi | 690 | 720 | 690 | 670 | 630 | 650 |
| 200% Modulus, psi | 940 | 970 | 950 | 900 | 860 | 900 |
| 300% Modulus, psi | 1230 | 1220 | 1260 | 1130 | 1080 | 1140 |
| 400% Modulus, psi | 1630 | 1490 | 1680 | 1390 | 1340 | 1360 |
| Die C Tear, pli | 400 | 460 | 450 | 460 | 450 | 440 |

Table 2 shows that mixtures of crystallizable polyols with conventional polyoxypropylene diols having higher unsaturation are far inferior to mixtures containing low monol polyoxypropylene diols. Elongations of similar formulations are higher with low monol diols by an average of 71% as compared to conventional diols, whereas tensile strength averages 14% higher as well.

EXAMPLE 8

An elastomer was prepared as in Examples 1–4 and C1–C7 but containing 90 equivalent percent 2000 Da PTMEG and 10 equivalent percent of a 1000 Da equivalent weight low monol polyoxypropylene diol having an unsaturation of 0.005 meq/g. As compared to an all PTMEG-derived control, the elastomer of Example 15 exhibited a 16% increase in elongation, a 13% increase in tensile strength and a 12% increase in tear strength.

EXAMPLES 9 AND 10 AND COMPARATIVE EXAMPLES C11 AND C12

Isocyanate-terminated prepolymers were prepared as in Examples 1–4 and C1–C7 and chain extended to form elastomers. However, crystallizable polyester polyols were utilized in lieu of PTMEG, with and without addition of 10 equivalent percent of a 2000 Da equivalent weight low monol polyoxypropylene diol. The results of measurement of the physical properties of the cured elastomers are presented in Table 3. In both cases where low monol polyoxypropylene diol was included in the prepolymer formulation, significant increases in elongation and tear strength were noted.

TABLE 3

| Polyol Type | 2000 Da Polybutyleneadipate | | 2000 Da Polycaprolactone Diol | |
|---|---|---|---|---|
| Example | C11 | 9 | C12 | 10 |
| Equiv. % 2000 Da eq. wt. Polyoxypropylene Diol; | 0 | 10 | 0 | 10 |
| Wt. % 2000 Da eq. wt. Polyoxypropylene Diol | 0 | 18 | 0 | 18 |
| Hardness, Shore A | 79 | 77 | 81 | 78 |
| Resilience, % | 63 | 63 | 67 | 67 |
| Elongation, % | 400 | 550 | 480 | 650 |
| Tensile Strength, psi | 5300 | 4660 | 5760 | 4590 |
| 100% Modulus, psi | 690 | 630 | 670 | 620 |
| 200% Modulus, psi | 1030 | 950 | 920 | 890 |
| 300% Modulus, psi | 1850 | 1450 | 1390 | 1270 |
| 400% Modulus, psi | 4860 | 2230 | 2420 | 1710 |
| Die C Tear, pli | 360 | 380 | 370 | 390 |

EXAMPLE 11 AND COMPARATIVE EXAMPLE C13

Elastomers were prepared from isocyanate-terminated prepolymers prepared by reacting toluene diisocyanate with a polyol component at an equivalent ratio of 2:1 and chain extending with M-CDEA, 4,4'-methylenebis(3-chloro-2,6-diethylaniline), an amine type chain extender. In both prepolymers, the polyol component contained PTMEG 2900, a nominal 2900 Da molecular weight PTMEG diol as the crystallizable polyol. The polyol component of subject invention Example 11, contains, in addition to the PTMEG, a 3000 Da molecular weight polyoxypropylene diol containing 10 weight percent random oxyethylene moieties and having an unsaturation of c.a. 0.006 meq/g, at a concentration of 20 equivalent percent based on the weight of the polyol component. The physical properties of the cured elastomers are presented in Table 4 below.

TABLE 4

| Example | C13 | 11 |
| --- | --- | --- |
| Equiv. % 3000 MW Diol | 0 | 20 |
| Wt. % 3000 MW Diol | 0 | 27 |
| Hardness, Shore A | 84 | 84 |
| Resilience, % | 64 | 62 |
| Elongation, % | 340 | 620 |
| Tensile Strength, psi | 1850 | 4140 |
| 100% Modulus, psi | 760 | 760 |
| 200% Modulus, psi | 1040 | 980 |
| 300% Modulus, psi | 1500 | 1230 |
| 400% Modulus, psi | — | 1650 |
| Die C Tear, pli | 335 | 399 |

Table 4 indicates that the increased physical properties of elastomers prepared in accordance with the subject invention by incorporating low monol polyoxypropylene diols into the prepolymer polyol component together with a crystallizable polyol are also obtained in aromatic diamine-extended polyurethanes. The incorporation of 20 equivalent weight percent of a 3000 Da low unsaturation, low monol diol into an otherwise similar PTMEG prepolymer increased the elongation of the elastomer by approximately 82%, while the tensile strength increased, at the same time, by 124%, more than a factor of two. The tear strength increased significantly as well.

Having now fully described the invention, it will be apparent to one of ordinary skill in the art that many changes and modifications can be made thereto without departing from the spirit or scope of the invention as set forth herein.

What is claimed is:

1. A polyurethane elastomer comprising the reaction product of a chain extender with an isocyanate-terminated prepolymer prepared by reacting a stoichiometric excess of one or more di- or polyisocyanates with a polyol component comprising from 65 to about 95 equivalent percent based on the weight of the polyol component of a crystallizable polyol having a number average equivalent weight of between about 500 Da and 6000 Da and from about 5 to about 35 equivalent percent based on the weight of the polyol component of a low monol polyoxyalkylene diol containing in excess of 70 weight percent oxypropylene moieties, a number average equivalent weight of from about 1000 Da to about 6000 Da, and a level of unsaturation of less than about 0.02 meq/g, said prepolymer having an NCO group content of from about 3 to less than 14 weight percent based on the weight of the prepolymer, at an isocyanate index between about 70 and 130.

2. The elastomer of claim 1 wherein said crystallizable polyol comprises a polyoxyethylene glycol, a polytetramethylene ether glycol or a polyester diol, or mixtures thereof.

3. The elastomer of claim 1 wherein said crystallizable polyol comprises a polytetramethylene ether glycol having an equivalent weight of from about 800 Da to about 2000 Da.

4. The elastomer of claim 2 wherein said polyester diol is a polycaprolactone diol.

5. The elastomer of claim 2 wherein said low monol polyoxypropylene diol has an unsaturation of less than 0.010 meq/g.

6. The elastomer of claim 1 wherein said crystallizable polyol comprises a polytetramethylene ether glycol having an equivalent weight of from about 800 Da to about 2000 Da, and wherein said low monol polyoxypropylene polyol comprises in major part one or more polyoxypropylene diols containing no more than about 20 weight percent oxyethylene moieties and having an equivalent weight of from about 1250 Da to about 4000 Da, and an unsaturation of about 0.010 meq/g or less.

7. The elastomer of claim 6 wherein said low monol polyoxypropylene polyol further comprises a polyoxypropylene diol having an unsaturation greater than 0.02 meq/g, such that the average unsaturation of said polyol component is less than 0.02 meq/g.

8. The elastomer of claim 1 wherein said crystallizable polyol comprises a polytetramethylene ether glycol and said elastomer has an elongation greater than about 800%.

9. The elastomer of claim 1 wherein said low monol polyoxypropylene diol comprises about 5 equivalent percent to about 25 equivalent percent of said polyol component.

10. The elastomer of claim 9 wherein said crystallizable polyol comprises a polytetramethylene ether glycol having an equivalent weight of from about 800 Da to about 2000 Da, and wherein said low monol polyoxypropylene polyol comprises in major part one or more polyoxypropylene diols containing no more than about 20 weight percent oxyethylene moieties having an equivalent weight of from about 1250 Da to about 4000 Da, and an unsaturation of about 0.010 meq/g or less.

11. The elastomer of claim 1 wherein said chain extender comprises a diol chain extender.

12. The elastomer of claim 1 wherein said chain extender comprises an aromatic diamine chain extender.

13. The elastomer of claim 12 wherein said aromatic diamine chain extender comprises 4,4'-methylenebis(3-chloro-2,6-diethylaniline).

14. The elastomer of claim 1 wherein said reacting takes place in the present of an amount of a blowing agent effective to produce a microcellular elastomer having a density of from about 0.15 g/cm$^3$ to 0.8 g/cm$^3$.

15. An isocyanate-terminated prepolymer or quasiprepolymer suitable for the preparation of polyurethane elastomers, said prepolymer of quasiprepolymer comprising the reaction product of a stoichiometric excess of one or more di- or polyisocyanates with a polyol component comprising from 25 to about 95 equivalent percent based on the weight of the polyol component of a crystallizable polyol having a number average equivalent weight of between about 500 Da and 6000 Da and from about 5 to about 35 equivalent percent based on the weight of the polyol component of a low monol polyoxyalkylene diol containing in excess of 70 weight percent oxypropylene moieties, having a number average equivalent weight of from about 1000 Da to about 6000 De, and a level of unsaturation of less than about 0.02 meq/g, said prepolymer having an NCO group content of from about 3 to about 20 weight percent based on the weight of the prepolymer or quasiprepolymer.

16. The isocyanate-terminated prepolymer or quasiprepolymer of claim 15 wherein said crystallizable polyol comprises a polyoxyethylene glycol, a polytetramethylene ether glycol, a polyester diol, or mixtures thereof.

17. The isocyanate-terminated prepolymer or quasiprepolymer of claim 15 wherein said crystallizable polyol comprises a polytetramethylene ether glycol having an equivalent weight of from about 800 Da to about 2000 Da.

18. The isocyanate-terminated prepolymer or quasiprepolymer of claim 16 wherein said polyester diol is a polycaprolactone diol.

19. The isocyanate-terminated prepolymer or quasiprepolymer of claim 15 wherein said low monol polyoxypropylene diol has an unsaturation of less than 0.010 meq/g.

20. The isocyanate-terminated prepolymer or quasiprepolymer of claim 15 wherein said crystallizable polyol comprises a polytetramethylene ether glycol having an equivalent weight of from about 800 Da to about 2000 Da, and wherein said low monol polyoxypropylene polyol comprises in major part one or more polyoxypropylene diols containing no more than about 20 weight percent oxyethylene moieties, having an equivalent weight of from about 1250 Da to about 4000 Da, and an unsaturation of about 0.010 meq/g or less.

21. The isocyanate-terminated prepolymer or quasiprepolymer of claim 20 wherein said low monol polyoxypropylene polyol further comprises a polyoxypropylene diol having an unsaturation greater than 0.02 meq/g, such that the average unsaturation of said polyol component is less than 0.02 meq/g.

22. The isocyanate-terminated prepolymer or quasiprepolymer of claim 20 wherein said crystallizable polyol comprises a polytetramethylene ether glycol and said elastomer has an elongation greater than about 800%.

23. The isocyanate-terminated prepolymer or quasiprepolymer of claim 20 wherein said low monol polyoxypropylene diol comprises about 5 equivalent percent to about 25 equivalent percent of said polyol component.

24. The isocyanate-terminated prepolymer of claim 20 wherein said crystallizable polyol comprises a polytetramethylene ether glycol having an equivalent weight of from about 800 Da to about 2000 Da, and wherein said low monol polyoxypropylene polyol comprises in major part one or more polyoxypropylene diols containing no more than about 20 weight percent oxyethylene moieties having an equivalent weight of from about 1250 Da to about 4000 Da, and an unsaturation of about 0.010 meq/g or less.

25. A method of increasing the physical properties of a chain-extended polyurethane elastomer prepared by the reaction of an isocyanate with a polyol component comprising a crystallizable polyol, said method comprising:
adding to said polyol component, from 5 equivalent percent to about 35 equivalent percent based on the weight of said polyol component of a polyoxypropylene polyol having an unsaturation of less than about 0.02 meq/g.

26. The method of claim 25 wherein said crystallizable polyol comprises PTMEG.

27. The method of claim 26 wherein said PTMEG has an equivalent weight of from about 800 Da to 2000 Da, and wherein said unsaturation is less than about 0.010 meq/g.

28. A polyurethane elastomer comprising the reaction product of a chain extender and polyoxyalkylene polyol with an isocyanate-terminated quasiprepolymer prepared by reacting a stoichiometric excess of one or more di- or polyisocyanates with a polyol component comprising from 65 to about 95 equivalent percent based on the weight of the polyol component of a crystallizable polyol having a number average equivalent weight of between about 500 Da and 6000 Da and from about 5 to about 35 equivalent percent based on the weight of the polyol component of a low monol polyoxyalkylene diol containing in excess of 70 weight percent oxypropylene moieties, a number average equivalent weight of from about 1000 Da to about 6000 Da, and a level of unsaturation of less than about 0.02 meq/g, said quasiprepolymer having an NCO group content of from about 14 to about 20 weight percent based on the weight of the quasiprepolymer, at an isocyanate index between about 70 and 130.

29. The elastomer of claim 26 wherein said polyoxyalkylene polyol is a mixture comprising a crystallizable polyol having a number average equivalent weight of from about 500 Da to 6000 Da and from about 5 to about 35 equivalent percent of a low monol polyoxyalkylene diol containing in excess of 70 weight percent oxypropylene moieties, a number average equivalent weight of from about 1000 Da to about 6000 Da, and a level of unsaturation of less than about 0.02 meq/g.

30. The elastomer of claim 28 wherein said crystallizable polyol is a polytetramethylene ether glycol.

31. The elastomer of claim 30 wherein said chain extender is selected from the group consisting of aliphatic diols having molecular weights below 300 Da, aromatic diamines, and mixtures thereof.

32. The elastomer of claim 31 wherein said aromatic diamine comprises 4,4'-methylenebis(3-chloro-2,6-diethylaniline).

33. The elastomer of claim 28 wherein said reaction product is prepared in the presence of an amount of a blowing agent effective to provide a microcellular elastomer having a density of from about 0.015 g/cm$^3$ to about 0.8 g/cm$^3$.

34. A one-shot polyurethane elastomer prepared by reacting one or more di- or polyisocyanates, with an isocyanate-reactive component comprising in substantial part by weight a polyol component comprising from 65 to about 95 equivalent percent based on the weight of the polyol component of a crystallizable polyol having a number average equivalent weight of between about 500 Da and 6000 Da and from about 5 to about 35 equivalent percent based on the weight of the polyol component of a low monol polyoxyalkylene diol containing in excess of 70 weight percent oxypropylene moieties, a number average equivalent weight of from about 1000 Da to about 6000 Da, and a level of unsaturation of less than about 0.02 meq/g, at an isocyanate index between about 70 and 130.

35. The elastomer of claim 34 wherein at least a portion of said low monol polyoxyalkylene diol comprises an oxyethylene capped polyoxyalkylene diol.

36. The elastomer of claim 35 wherein said oxyethylene capped polyoxyalkylene diol has a primary hydroxyl content of between 35 mol percent and 90 mol percent.

37. The elastomer of claim 35 wherein said oxyethylene capped polyoxyalkylene diol has a primary hydroxyl content of between 70 mol percent and 90 mol percent.

38. The elastomer of claim 34 wherein said crystallizable polyol comprises polytetramethylene ether glycol.

39. The elastomer of claim 34 wherein said isocyanate reactive component further comprises a chain extender selected from the group consisting of aliphatic diols having molecular weights lower than 300 Da, aromatic diamines, and mixtures thereof.

40. The elastomer of claim 34 wherein said elastomer is prepared in the presence of an amount of a blowing agent effective to produce a microcellular elastomer having a density of from about 0.15 g/cm$^3$ to about 0.8 g/cm$^3$.

41. A polyurethane elastomer comprising the reaction product of a B-side comprising a chain extender and a crystallizable polyol having a number average molecular weight of between 500 Da and 6000 Da with an A-side comprising an isocyanate-terminated quasiprepolymer having a NCO group content of from about 14 to about 20 weight percent based on the weight of the quasiprepolymer, said quasiprepolymer prepared by the reaction of a stoichiometric excess of one or more di- or polyisocyanates with a low monol polyoxyalkylene diol containing in excess of 70 mol percent oxypropylene moieties, a number average equivalent weight of from about 1000 Da to 6000 Da and a level of unsaturation of less than about 0.02 meq/g and optionally an amount of said crystallizable polyol, wherein said elastomer contains from about 5 to about 35 equivalent percent low monol polyoxyalkylene diol-derived moieties and from about 65 to about 95 equivalent percent crystallizable polyol-derived moieties, said equivalent percents relative to the sum of said low monol polyoxyalkylene diol-derived moieties and said crystallizable polyol-derived moieties.

42. The elastomer of claim 41 wherein said crystallizable polyol comprises polytetramethylene ether glycol.

43. The elastomer of claim 41 wherein all of said crystallizable polyol is contained in said B-side.

* * * * *

UNITED STATES PATENT AND TRADEMARK OFFICE
CERTIFICATE OF CORRECTION

PATENT NO. : 5,648,447
DATED : July 15, 1997
INVENTOR(S) : Stephen D. Seneker et al.

It is certified that error appears in the above-indentified patent and that said Letters Patent is hereby corrected as shown below:

Column 14, line 29: delete "$0.015 \text{ g/cm}^3$" and insert therefor --$0.15 \text{ g/cm}^3$--.

Signed and Sealed this

Seventh Day of October, 1997

*Attest:*

BRUCE LEHMAN

*Attesting Officer*   Commissioner of Patents and Trademarks